United States Patent [19]

Zeidler

[11] Patent Number: 5,177,809
[45] Date of Patent: Jan. 5, 1993

[54] OPTICAL CABLE HAVING A PLURALITY OF LIGHT WAVEGUIDES

[75] Inventor: Guenter Zeidler, Germering, Fed. Rep. of Germany

[73] Assignee: Siemens Aktiengesellschaft, Munich, Fed. Rep. of Germany

[21] Appl. No.: 796,019

[22] Filed: Nov. 22, 1991

[30] Foreign Application Priority Data

Dec. 19, 1990 [DE] Fed. Rep. of Germany ....... 4040712

[51] Int. Cl.$^5$ .............................................. G02B 6/44
[52] U.S. Cl. ..................................................... 385/105
[58] Field of Search ................................. 385/105, 110

[56] References Cited

U.S. PATENT DOCUMENTS

| | | | |
|---|---|---|---|
| 4,199,224 | 4/1980 | Oestreich | 350/96.23 |
| 4,361,381 | 11/1982 | Williams | 385/105 |
| 4,699,461 | 10/1987 | Taylor et al. | 385/110 |
| 4,807,962 | 2/1989 | Arroyo et al. | 385/105 |
| 4,820,014 | 4/1989 | Nishimura et al. | 385/105 |
| 4,983,013 | 1/1991 | Dotzer et al. | 350/96.23 |
| 4,997,257 | 3/1991 | Spedding | 385/110 |

FOREIGN PATENT DOCUMENTS

| | | |
|---|---|---|
| 0394618 | 10/1990 | European Pat. Off. . |
| 2930643 | 2/1980 | Fed. Rep. of Germany . |
| 2449439 | 8/1984 | Fed. Rep. of Germany . |
| 3937695 | 5/1991 | Fed. Rep. of Germany . |
| 61-282806 | 12/1986 | Japan . |
| 2026718 | 2/1980 | United Kingdom . |

Primary Examiner—Frank Gonzalez
Attorney, Agent, or Firm—Hill, Van Santen, Steadman & Simpson

[57] ABSTRACT

An optical cable comprises a plurality of light waveguides, which are combined in a group of small bands, and the group of small bands are arranged in longitudinally extending chambers of a core element. Each of the chambers in the core element can have an increasing width as the radial distance from the center of the core element increases and the bands can be arranged in sub-stacks having increases widths corresponding to the increased width of the chamber. In another embodiment, each of the bands in the stack has an increasing width in the radial direction to fill the chamber. In another embodiment, each of the chambers has a rectangular cross section, with the cross section increasing in a step-like manner due to steps formed in the partitions and the bands which are arranged in the chambers are arranged in sub-stacks to fill each portion of the chamber.

11 Claims, 1 Drawing Sheet

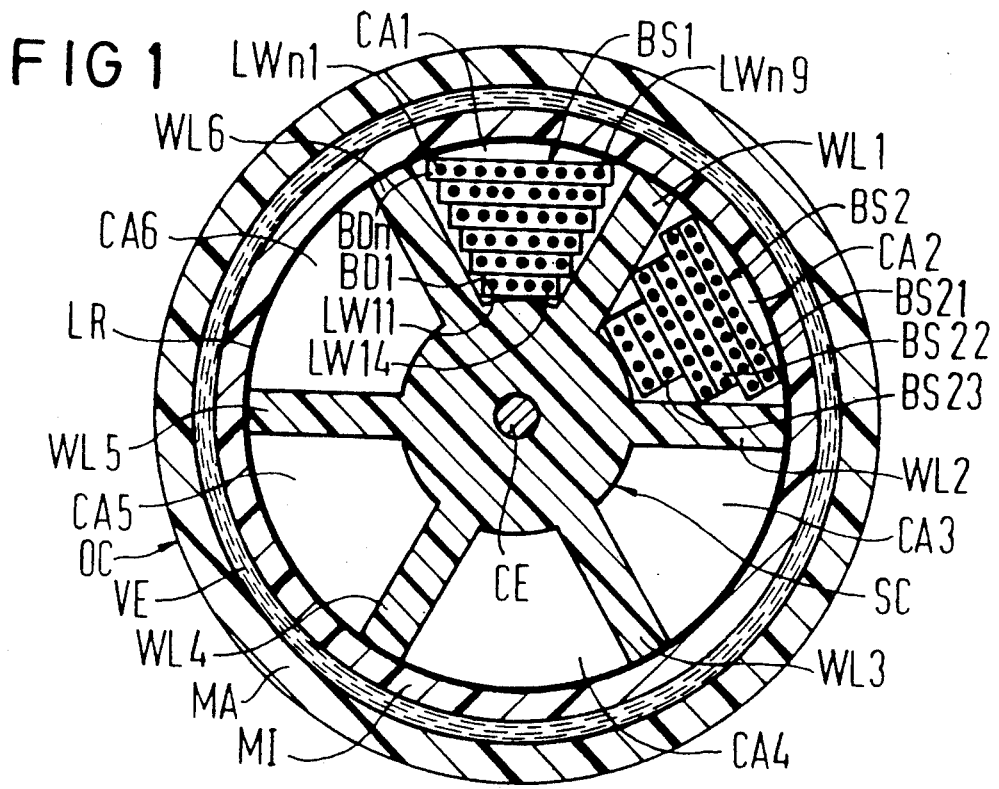
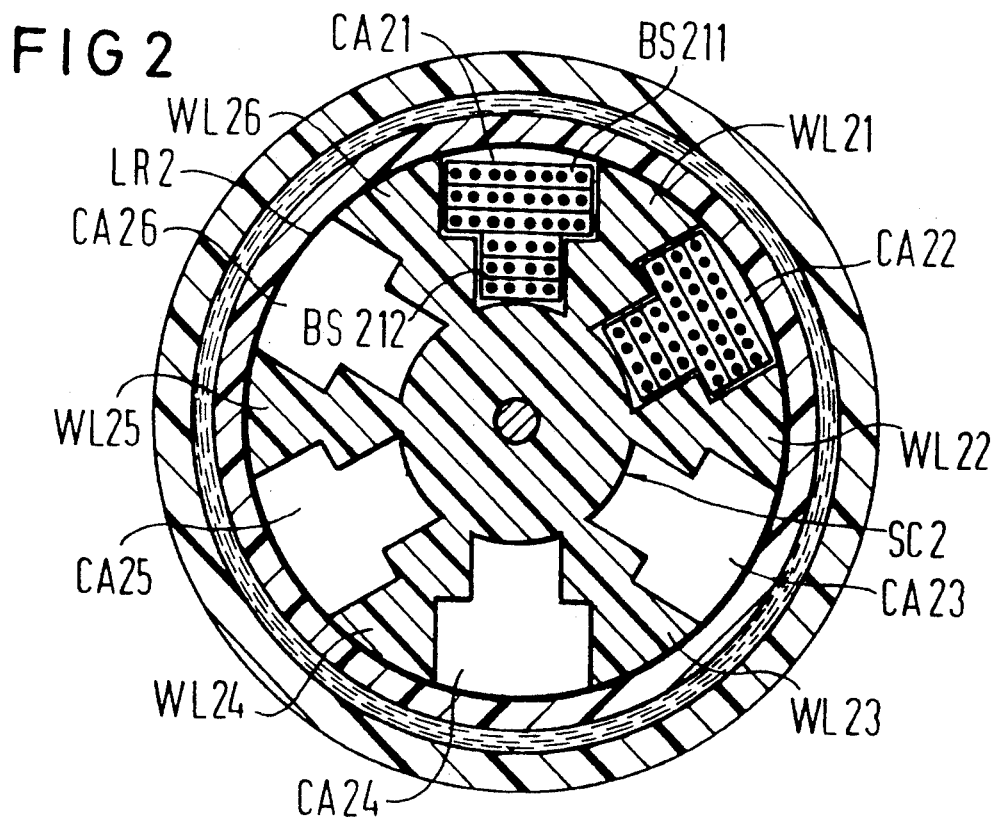

OPTICAL CABLE HAVING A PLURALITY OF LIGHT WAVEGUIDES

BACKGROUND OF THE INVENTION

The present invention is directed to an optical cable comprising a plurality of light waveguides that are each, respectively, combined in groups to form small bands, said small bands being assembled in stacks of bands which are respectively arranged in chambers of a core element that is formed by partitions, which chambers expand as a radial distance from the center axis of the core to the outside increases.

U.S. Pat. No. 4,983,013, whose disclosure is incorporated herein by reference thereto, and which corresponds to European Application A1 0 356 786, discloses an optical cable having a core element which is provided with approximately rectangular chambers. Such structures, which are also referred to as a chambered cables are frequently employed together with ribbon conductors or strip lines, wherein a plurality of light waveguides are combined to form a small band having approximately a rectangular cross section. A plurality of these small bands are united to form a stack of bands with a rectangular cross section, and the rectangular cross section of the stack is adapted to the approximate rectangularly fashioned chamber, which, likewise, has a rectangular shape. Only a small gap is left inside the chamber in order to guarantee a certain mobility of the stack of bands therein, however, a change in position, for example a twisting or tilting of the stack of the bands, should be prevented.

With an increasing plurality of small bands within a stack, the partitions between the individual chambers become broader and broader toward the outside and are lent in approximately wedge-shaped cross section. According to the above-mentioned U.S. Patent, the space presented here can be utilized to a certain extent in that additional depressions or grooves, which open toward the outside and have an approximately triangular cross section, are provided in the partition. These additional grooves are employed for other purposes, for example for the introduction of electrical conductors or the like. These cross sections of these additional grooves, however, are not suitable for the introduction of additional light waveguides, for example in the form of stacks of small bands, because, first, they are relatively small and, secondly, they have essentially a triangular shape.

U.S. Pat. No. 4,199,224, whose disclosure is incorporated herein by reference thereto, and which claims priority from German Patent Application 24 49 439, discloses a chambered cable, which is fashioned so that the chambers each have a radially expanding cross section and, thus, have approximately a sector-shaped structure. In this case, however, the light waveguides are introduced as discrete elements in these chambers and are not combined to form small bands or stacks.

Given an extremely high number of fibers, a structure having light waveguide bands leads to unnecessarily large cable diameters because the space in the region of the core element cannot be adequately utilized.

SUMMARY OF THE INVENTION

The object of the present invention is to provide a way in which it is possible to optimally exploit the existing space or, expressed in other words, to accommodate the optimum plurality of light waveguides within a given space and to thereby realize a high transmission capacity.

According to the invention, this object is achieved in an improvement in an optical cable having a plurality of light or optical waveguides that are, respectively, combined in small groups to form small bands, wherein a plurality of each of the bands is respectively formed into stacks that are respectively arranged in chambers provided in a core element, wherein the chambers are formed by partitions and have an expanding cross section as the radial distance from the center increases to the outside. The improvement is that the bands of the stacks comprise a plurality or number of light waveguides which increase in such a way as the distance of the bands in the stack from the center increases so that the chamber space which is limited by the partitions is optimally largely filled. In other words, bands having increasing numbers of light waveguides are used, and these bands are arranged in the stack so that the narrowest bands are disposed adjacent the base of the chamber, while the bands having the larger number of waveguides are disposed radially outward therefrom.

The invention, thus, makes it possible to retain the advantages of the band structures, which advantages include easy identification, simple connecting technique and compact structure, to simultaneously largely utilize the available space. Given the same outside diameter of the optical cable, an increased number of fibers can, thus, be carried in comparison to the rectangular chambers heretofore standard, given employment of stacks of bands. Conversely, a smaller outside diameter of the cable and, thus, a lower expense for material and a better bending and laying capability will occur given the same number of light waveguides within the cable in comparison to the known structure that works with rectangularly fashioned chambers.

Other advantages and features of the invention will be readily apparent from the following description of the preferred embodiments, the drawings and claims.

BRIEF DESCRIPTION OF THE DRAWINGS

FIG. 1 is a cross sectional view through a structure of an optical cable in accordance with the present invention; and FIG. 2 is a cross sectional view of a modification of an optical cable in accordance with the present invention.

DESCRIPTION OF THE PREFERRED EMBODIMENTS

The principles of the present invention are particularly useful when incorporated in an optical cable, generally indicated at OC in FIG. 1. The optical cable OC comprises a central element CE, which is the core and is composed of a highly tensiled material. A core element, generally indicated at SC is applied on this central element and is, preferably, extruded thereon. This core element SC, in the present example, includes six radially outwardly projecting partitions WL1-WL6. These partitions are shaped so that they essentially comprise a constant wall thickness proceeding from the inside toward the outside so that they form six chambers CA1-CA6, which have approximately a sector-shaped cross section and, thus, expand in proportion to the radial distance from the central element CE. As seen in the longitudinal direction, the chambers CA1-CA6 can proceed helically around the central element CE.

The chambers CA1–CA6 are closed toward the outside by a covering or wrapping LR after the light waveguide bands have been introduced. Following in the direction toward the outside in a known way are, for example, a first inside cladding Ml of a plastic material. Then, potentially, a reinforcing ply or layer VE of tensile aramid threads is applied on the layer or cladding Ml and then an outside cladding MA is extruded on this reinforcing ply or layer VE. In addition, diffusion barriers, which are not shown, can be provided to prevent the penetration of water vapor.

The light waveguides are arranged in the form of small band structures having an approximately rectangular cross section, wherein such band structures, such as BD1–BDn are stacked on top of one another in the chambers CA1 and the stacking direction proceeds approximately radially to form a stack BS1. It is assumed in the present example that the inner band BD1 of the stack BS1 comprises four light waveguides LW11–LW14. The outermost band BDn of the stack BS1 contains nine light waveguides LWn1–LWn9. It is assumed in the present example of the stack BS1 that six such bands (n=6) are stacked on top of one another and each of these, respectively, moves from the innermost band toward the outermost band contains one more light waveguide than the next inner band. It is assumed in this way that an optimum and practically complete exploitation of the available space of the chamber CA1 is achieved by the stack BS1.

The remaining outer gap between the band stack and the chamber walls within the chamber CA1 should be selected so small that the light waveguide bands BD1–BDn of the stack BS1 can, in fact, move in a sliding fashion within the chamber CA1, but the gap is such that no change in position or turning of the stack of bands can occur. This is necessary so that the light waveguide bands remain in their illustrated, essentially tangentially extending position when the cable is bent, because an especially gentle handling of the bands and a correspondingly gentle laying of the finished cable is possible in this manner.

It is expedient, in some instances, to close the remaining lateral space and also a potential gap by the wrapping LR with, for example, an anti-seizing agent, a powder that potentially swells given the entry of water, or a filling compound that contains soft oils and, potentially, a thixotropic agent.

Given the band structure provided for the chamber CA1, it is necessary to offer an extremely great number of bands BD1–BDn provided with different numbers of light waveguides. If this is undesirable, one can proceed in accordance with a modification, which is illustrated by the structure arranged in the chamber CA2, wherein a stack BS2 is composed of a total of three sub-stacks BS21, BS22 and BS23. The innermost sub-stack BS23 contains two bands, each having, respectively, four light waveguides. The middle sub-stack BS22 contains two bands, each having eight light waveguides. The outermost sub-stack BS21 contains two bands, each having, respectively, ten light waveguides. Compared to the embodiment shown for the chamber CA1, only half as many types of bands are required in this arrangement, namely a total of three, as compared to the six different bands used in the modification shown in chamber CA1.

In the embodiment illustrated in FIG. 1, each of the partitions WL1–WL6 has a constant thickness. It may be desirable to adapt the structure of each of these partitions to conform to their respective number of sub-stacks. In FIG. 2, for example, a core element, generally indicated at SC2, is constructed with partitions WL21–WL26, which are fashioned with graduated steps to leave, respectively, approximately rectangular sub-chambers therebetween. The wall thickness in the innermost part of the chamber is selected just as an exemplary embodiment of FIG. 1, so that the respective walls still have adequate thickness in the region of the floor of the chamber. The wall thickness should not fall below values of between 1 mm and 2 mm at the thinnest location. The sub-stack BS212, which is composed of three bands, each having four light waveguides, is accommodated in the first rectangular sub-chamber between the walls WL26 and WL21. A second sub-stack BS211, which contains three light waveguide bands, each containing eight light waveguides, is arranged in the outer or second sub-chamber that is, likewise, approximately rectangular. The approximately angular, triangular sub-cutouts from the walls, such as WL26 and WL21, provide an especially good guidance and additional bearing for the light waveguide bands of an outer stack BS211. The described structure can be continued toward the outside by providing incisions or cuts into the sides to form a step-like structure. Thus, additional sub-stacks having an increasing number of light waveguides can be placed outward of the sub-stack BS211 if additional step-like structures are provided.

With respect to the number of bands, as well as with respect to the number of light waveguides, the numerical examples are only to be understood as assumed values for illustrating the principles of the invention. They can be arbitrarily modified, as desired.

In practice, all chambers are selected of the same size and the same type of stack of bands is accommodated in every chamber.

Although various minor modifications may be suggested by those versed in the art, it should be understood that I wish to embody within the scope of the patent granted hereon all such modifications as reasonably and properly come within the scope of my contribution of the art.

I claim:

1. An optical cable comprising a core element having a plurality of radially extending partitions forming a plurality of chambers opening radially outward from a center of the core, each of said chambers having a radially inward base of a first dimension and having portions spaced radially from the base of a wider width; and a plurality of bands having an approximately rectangular cross section and each of the bands containing a number of optical waveguides, said bands being arranged in stacks received in said chambers with the bands adjacent the base of each chamber, said bands adjacent the base having a width and a number of waveguides to enable the band to be received snugly in the chamber and those bands in the stack spaced from the base having a greater width to be received in enlarged portions of the chamber so that an optimally large filling of each chamber with the bands is obtained, each of the bands being adapted to the shape of the corresponding partition of the chamber so that only a narrow gap, respectively, remains outside of the longitudinal edges of each band in the stack to allow slight longitudinal motion, but preventing twisting of a stack of bands within the chamber.

2. An optical cable according to claim 1, wherein an increase of the number of optical waveguides in the band occurs with each adjacent band, with each band in the stack having a progressively larger number of waveguides as a radial spacing of the band from the base increases.

3. An optical cable according to claim 2, wherein each of the partitions has essentially a constant wall thickness in the radial direction.

4. An optical cable according to claim 1, wherein the increase in the number of optical waveguides occurs in steps with a plurality of bands having the same number of optical waveguides being combined to form a sub-stack.

5. An optical cable according to claim 4, wherein at least two sub-stacks comprising a plurality of bands are provided for each chamber, the sub-stack of bands having a greater number of optical waveguides in a band being disposed radially further from the center of the cable than the sub-stack having the bands with a lower number of optical waveguides.

6. An optical cable according to claim 5, wherein the partitions have essentially a constant wall thickness taken in a radial direction.

7. An optical cable according to claim 5, wherein the partitions are constructed in a graduated step-like manner to form sub-chambers having a rectangular cross section in each chamber, with the width of the sub-chambers increasing in a step-like manner as the radial distance from the center increases, and the sub-stacks having a number of bands corresponding to the radial thickness of each step of the partition.

8. An optical cable according to claim 1, wherein each of the partitions has a substantially constant wall thickness taken in the radial direction.

9. An optical cable according to claim 8, wherein the number of waveguides in each band progressively increases as the radial distance of the band in the stack from the center of the cable increases.

10. An optical cable according to claim 8, wherein the stack of bands is sub-divided into a plurality of sub-stacks, with each sub-stack having at least two bands, each band in a sub-stack having the same number of optical waveguides, said sub-stacks being arranged with the sub-stack having the smallest width being the radially inwardmost sub-stack, and the sub-stack with the greatest width being the radially outwardmost sub-stack.

11. An optical cable according to claim 1, wherein each of the partitions has a step configuration so that each of the chambers has at least two portions, with each portion having a rectangular cross section and the innermost portion having a smaller width than the outermost portion, said stack of bands being sub-divided into sub-stacks, with each sub-stack corresponding to a portion of said chamber so that each of said sub-stacks is received in a chamber with a small gap, which allows a longitudinal motion but prevents twisting of the sub-stack in each portion.

* * * * *